(12) United States Patent
Wang et al.

(10) Patent No.: US 6,590,311 B1
(45) Date of Patent: Jul. 8, 2003

(54) CROSS-SHAPED ROTOR SHAFT FOR ELECTRICAL MACHINE

(75) Inventors: Yu Wang, Clifton Park, NY (US); Christopher Anthony Kaminski, Niskayuna, NY (US); James Pellegrino Alexander, Ballston Lake, NY (US); George Hanna Ghanime, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/589,688

(22) Filed: Jun. 9, 2000

Related U.S. Application Data
(60) Provisional application No. 60/169,243, filed on Dec. 6, 1999.

(51) Int. Cl.$^7$ .................................................. H02K 1/22
(52) U.S. Cl. ........................................ 310/261; 310/269
(58) Field of Search ................................ 310/261, 216, 310/194, 269, 218, 179; 29/598

(56) References Cited

U.S. PATENT DOCUMENTS

| | | | |
|---|---|---|---|
| 336,636 A | * 2/1886 | Gerard-Lescuyer | ....... 310/40 R |
| 640,760 A | * 1/1900 | Geisenhoner | ................ 310/168 |
| 729,655 A | * 6/1903 | Parsons | ....................... 310/261 |
| 1,502,527 A | * 7/1924 | Reichel et al. | ......... 310/156.33 |
| 2,733,362 A | * 1/1956 | Bauer | .......................... 310/162 |
| 3,375,385 A | * 3/1968 | Young | ......................... 310/261 |
| 3,590,301 A | * 6/1971 | Woydt | ......................... 310/269 |
| 4,163,912 A | * 8/1979 | Gottung et al. | ................ 310/45 |
| 4,336,470 A | * 6/1982 | Gutris | .......................... 310/42 |
| 4,490,638 A | * 12/1984 | Lind | ........................... 310/194 |
| 5,144,182 A | * 9/1992 | Lemmer et al. | ............. 310/217 |
| 5,359,248 A | * 10/1994 | Nagate et al. | .............. 310/156 |
| 5,811,907 A | * 9/1998 | Fukuda et al. | .............. 310/254 |

* cited by examiner

*Primary Examiner*—Joseph Waks
(74) *Attorney, Agent, or Firm*—Armstrong Teasdale LLP

(57) ABSTRACT

A rotor for a rotating electrical machine includes pole faces arranged at locations on either side, respectively, of the rotor D-axis and fins arranged along the rotor Q-axis. The fins increase a section bending moment of inertia along the Q-axis, thereby reducing the need for deep slots in the pole faces extending along the D-axis, resulting in better symmetry of bending stiffness.

10 Claims, 2 Drawing Sheets

CROSS-SHAPED ROTOR SHAFT FOR ELECTRICAL MACHINE

This application claims the benefit of U.S. Provisional Patent Application Serial No. 60/169,243, filed Dec. 6, 1999, the entire content of which is herein incorporated by reference.

BACKGROUND OF THE INVENTION

The present invention relates to electrical machines and, more particularly, to a cross-shaped rotor for a rotating electrical machine, such as a generator, including fins that increase the section bending moment of inertia about an axis.

In a conventional generator having a rotor and a stator, the rotor is provided with field windings that excite the generator while receiving a current from an exciting current source. The stator is provided with armature windings which supply electrical power output.

Conventional generator rotors use cross-slots to equalize the bending stiffness between direct (D) and quadrature (Q) axes. With newer generators using a modular winding assembled over a solid rotor with parallel sides, dissymmetry of the bending stiffness is aggravated and effective winding support and position become significant challenges.

BRIEF SUMMARY OF THE INVENTION

In an exemplary embodiment of the invention, a generator rotor includes pole faces arranged at locations on a direct axis and fins arranged along a quadrature axis such that the rotor is cross-shaped. The direct and quadrature axes are each normal to the rotor axis of rotation. The fins act to increase a section bending moment of inertia about the direct axis and provide winding position reference and bases of winding support. In one embodiment, the rotor includes two pole faces situated on the direct axis at either side of the quadrature axis, respectively. The fins may be formed integral with the rotor, such as by machining, forging welding, or casting. Alternatively, the fins may be mechanically secured to the rotor.

In another exemplary embodiment of the invention, an electric generator includes a rotor provided with field windings and a stator provided with armature windings which supply electrical power output. The rotor comprises pole faces arranged at locations on a direct axis and fins arranged along a quadrature axis such that the rotor is cross-shaped.

DETAILED DESCRIPTION OF THE INVENTION

Figure 1:
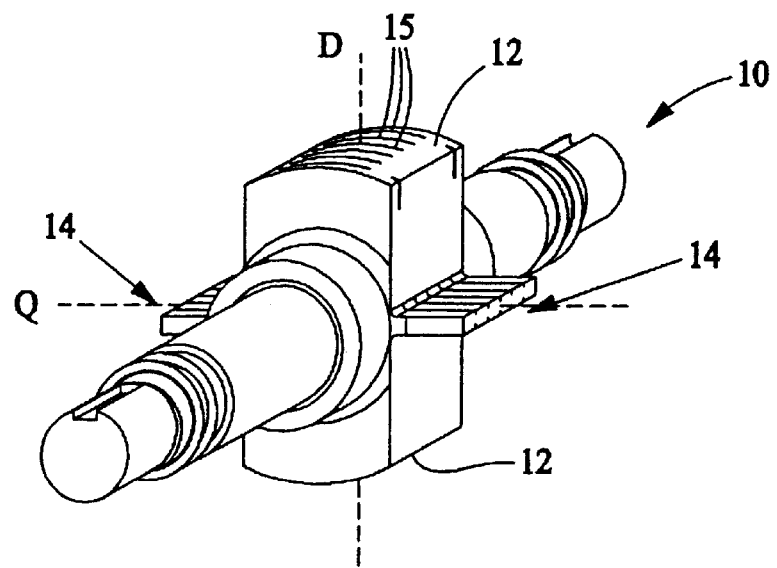
FIG. 1 is an isometric view of a rotor forging employed in an embodiment of the invention.
Figure 2:
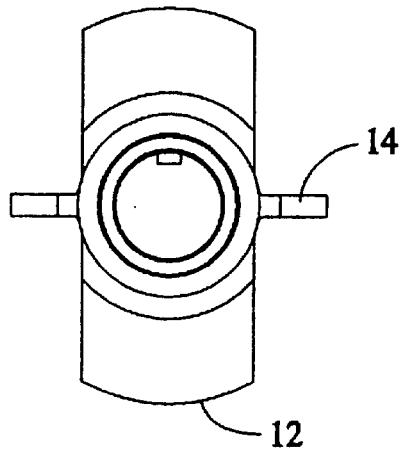
FIG. 2 is an end view of the rotor forging of FIG. 1.
Figure 3:
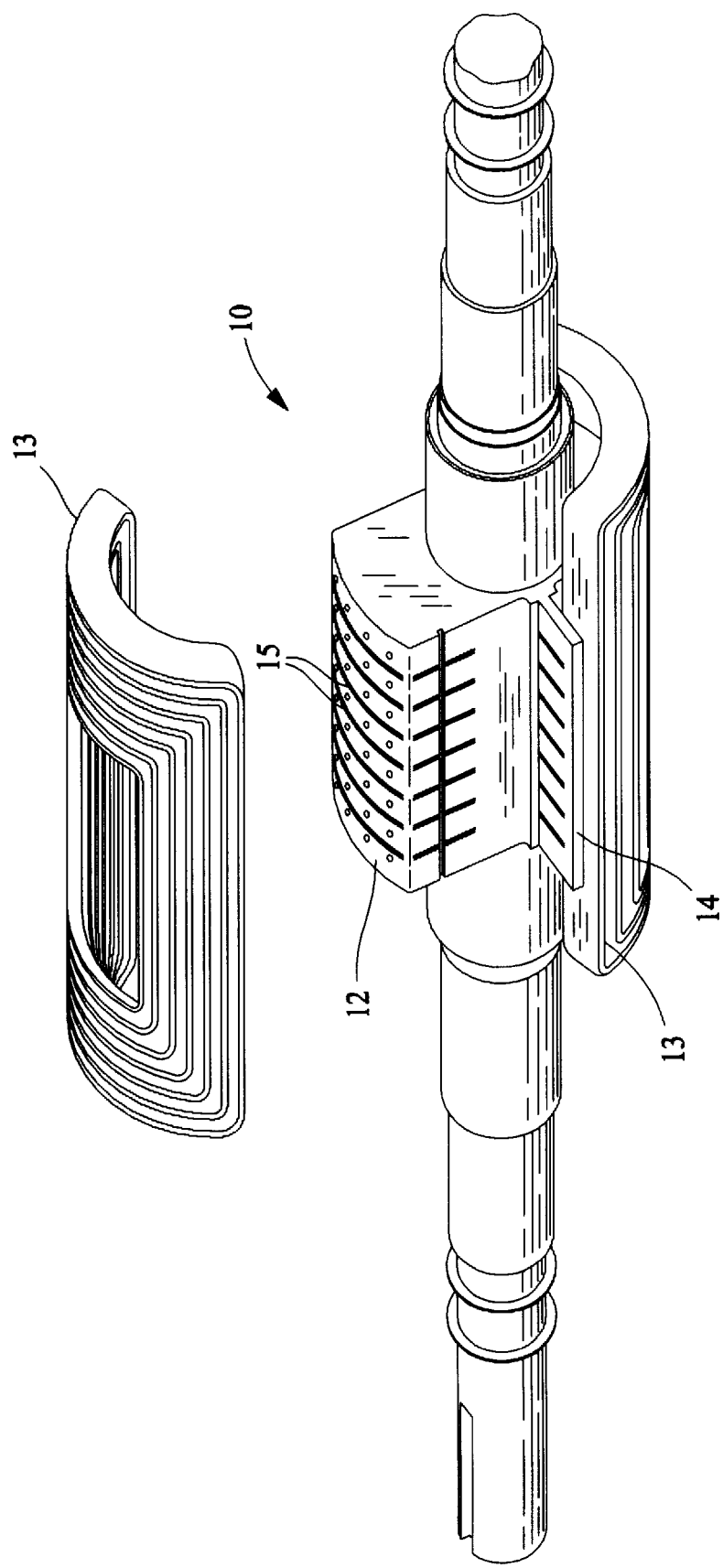
FIG. 3 is an exploded, partially cut away view of a rotor assembly incorporating the rotor forging of FIGS. 1 and 2.

Referring to FIGS. 1 and 2, a cross-shaped two-pole rotor 10 is shown including a pair of pole faces 12 arranged along the D-axis at opposite sides of the Q-axis. A pair of field winding assemblies 13, as shown in FIG. 3, are slid over the opposite sides of forging 10, and the entire rotor assembly is contained within a rotor housing (not shown).

In order to increase the section bending moment of inertia about the D-axis, since the winding modules can be assembled from either pole face 12, fins 14 are arranged along the Q-axis without interfering with the assembly. With the increased bending moment of inertia about the D-axis, the depth of slots 15 in pole faces 12 along the D-axis can be reduced, resulting in better symmetry of bending stiffness. The fins are also selected to be of appropriate thickness to provide a well-defined predetermined position reference for the field winding assemblies, as well as a well-defined locking interface for spacer blocks between the field winding assemblies.

Fins 14 can be fabricated in any suitable manner, including being integral with the rotor by being machined or forged from a forging at the rotor, cast with a forging of the rotor, or welded to the rotor. Alternatively, fins 14 may be mechanically secured to the rotor using dovetails or the like.

While the invention has been described in connection with what is presently considered to be the most practical and preferred embodiments, it is to be understood that the invention is not limited to the disclosed embodiments and is intended to cover various modifications and equivalent arrangements included within the spirit and scope of the appended claims.

What is claimed is:

1. A rotor for a rotating electrical machine, said rotor comprising:

only two pole faces disposed along a direct axis extending through said pole faces, each said pole face extending a first substantially perpendicular distance outwardly from said direct axis; and at least one fin disposed along a quadrature axis and extending a second substantially perpendicular distance outwardly from said direct axis, said second distance is greater than said first distance, said direct axis, said quadrature axis, and a rotation axis of said rotor being mutually orthogonal such that said rotor is cross-shaped when viewed from said rotation axis.

2. A rotor according to claim 1, wherein the fins are integral with the rotor.

3. A rotor according to claim 1, wherein the fins are mechanically secured to the rotor.

4. A rotor according to claim 1, wherein said pole faces are slotted.

5. A rotor according to claim 1, including a pair of field winding assemblies situated at either side of said pole faces and abutting said fins.

6. A rotor according to claim 5, wherein thickness of said fins is selected to provide a predetermined position reference for said field winding assemblies.

7. A rotor according to claim 6, wherein said pole faces are slotted.

8. A rotor for a rotating electrical machine comprising:

only two pole faces disposed along a direct axis extending through said pole faces, each said pole face extending a first substantially perpendicular distance outwardly from said direct axis;

at least one fin disposed along a quadrature axis and extending a second substantially perpendicular distance outwardly from said direct axis, said second distance is greater than said first distance, said direct axis, said quadrature axis, and a rotation axis of said rotor being mutually orthogonal such that said rotor is cross-shaped when viewed from said rotation axis, and only two field winding assemblies, each surrounding a respective one of said pole faces and abutting said fins.

9. A rotor according to claim 8, wherein the fins are integral with the rotor.

10. A rotor according to claim 8, wherein the fins are mechanically secured to the rotor.

* * * * *